(12) United States Patent
Estkowski

(10) Patent No.: US 6,799,087 B2
(45) Date of Patent: Sep. 28, 2004

(54) METHOD AND APPARATUS FOR PROVIDING AGENT SWARM DISPERSAL AND SEPARATION BY DIRECTED MOVEMENT

(75) Inventor: Regina Estkowski, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 47 days.

(21) Appl. No.: 10/342,100

(22) Filed: Jan. 13, 2003

(65) Prior Publication Data

US 2003/0176947 A1 Sep. 18, 2003

Related U.S. Application Data

(63) Continuation-in-part of application No. 09/903,879, filed on Jul. 10, 2001, now Pat. No. 6,507,771.
(60) Provisional application No. 60/217,232, filed on Jul. 10, 2000, and provisional application No. 60/217,226, filed on Jul. 10, 2000.

(51) Int. Cl.[7] .............................................. G06F 19/00
(52) U.S. Cl. ....................... 700/245; 700/251; 700/259; 318/568.1; 318/580; 318/587; 701/22; 701/23; 701/28; 701/50; 901/1; 901/3; 901/46; 901/47
(58) Field of Search ................................ 700/245, 251, 700/259; 318/568.1, 580, 587; 701/22, 23, 28, 50; 901/1, 3, 46, 47

(56) References Cited

U.S. PATENT DOCUMENTS

| | | | | |
|---|---|---|---|---|
| 4,119,900 A | * | 10/1978 | Kremnitz ....................... | 701/23 |
| 4,882,694 A | * | 11/1989 | Brubaker et al. .............. | 701/28 |
| 5,165,064 A | * | 11/1992 | Mattaboni ................. | 356/141.2 |
| 6,249,252 B1 | * | 6/2001 | Dupray ........................ | 342/450 |
| 2003/0146871 A1 | * | 8/2003 | Karr et al. ................... | 342/457 |
| 2003/0208302 A1 | * | 11/2003 | Lemelson et al. .......... | 700/245 |
| 2003/0222820 A1 | * | 12/2003 | Karr et al. ................... | 342/457 |

OTHER PUBLICATIONS

Rybski et la., Performance of a distributed robotic system using share communication channels, 2002, IEEE, pp. 713–727.*

Hutin et al., A communicaiton strategy for cooperatative robots, 1998, IEEE, pp. 114–119.*

Berger et al., Autonomous agent communication in an industrial environment using DECT, 1996, IEEE, pp. 37–40.*

Lo et al., Indoor wireless LAN access methods for factories, 1990, IEEE, pp. 113–118.*

* cited by examiner

*Primary Examiner*—William A. Cuchlinski, Jr.
*Assistant Examiner*—McDieunel Marc
(74) *Attorney, Agent, or Firm*—Tope-McKay & Associates

(57) ABSTRACT

A method, apparatus, and computer program product are presented for directing the movement of an agent in an environment. The operations of the invention comprise determining at least a first zone and direction to objects in at least a portion of the environment around the agent. A determination is also made regarding whether the agent is surrounded by objects. If the agent is surrounded by objects, it stays in the same position, and if it is not surrounded, a determination is made regarding whether the closest object is beyond the first zone from the agent. If the closest object is beyond the first zone, the agent may be moved toward a portion of the environment having the greatest object-saturation, and if the closest object is within the first zone, the agent can be moved toward a portion of the environment having the least object-saturation. Other zones may be provided.

129 Claims, 6 Drawing Sheets

METHOD AND APPARATUS FOR PROVIDING AGENT SWARM DISPERSAL AND SEPARATION BY DIRECTED MOVEMENT

PRIORITY CLAIM

This application is a continuation in part of U.S. patent application Ser. No. 09/903,879, titled "Method and Apparatus for Controlling the Movement of a Plurality of Agents", filed Jul. 10, 2001 now U.S. Pat. No. 6,507,771, which, in turn, claims priority to provisional application No. 60/217,232, filed in the United States on Jul. 10, 2000, and titled "Emergent Movement Control for Large Groups of Robots" and provisional application No. 60/217,226, filed in the United States on Jul. 10, 2000, and titled "Terrain Reasoning with Distributed Embedded Processing Elements".

STATEMENT OF GOVERNMENT RIGHTS

This invention is related to work performed in contract with the U.S. Government under DARPA ITO Contract #N66001-99-C-8514, "Pheromone Robotics", and the U.S. Government may have certain rights in this invention.

BACKGROUND OF THE INVENTION (1) Technical Field

The present invention is related to the field of controlling movement for large groups of agents in physical and computing environments. More specifically, this disclosure presents a method for controlling the movement of a plurality of agents using low bandwidth communications.

(2) Discussion

Over the past few decades, approaches to controlling agents have focused on individual agents and a centralized database. As a result, traditional control of agents and sensors has taken the form of a single mobile agent or a small number of agents using a pre-constructed digital map to aid in path planning and control of the agents or agents. It was necessary to develop a large centralized terrain/environment database to serve as the pre-constructed digital map for geometric computations. Typical computations at these centralized databases include determination of shortest path to destination, and routes to destinations. Information relevant to these approaches can be found in U.S. Pat. Nos. 4,119,900; 4,882,694; 5,165,064; and 5,170,351. However, the agent control systems disclosed in each one of these references suffers from one or more of the following disadvantages: 1) the agent is oriented within a fixed surface area; 2) the system only allows for narrow applications of distance-maintenance; 3) the system requires a master station and a means to locate the agent; 4) the system requires cameras to locate the mobile agents; 5) the employment of an array of ultrasonic transducers is required on mobile agents; 6) each agent is individually controlled and monitored by a large master station database; and 7) each agent monitors a sector of workspace. An alternative technique, termed the gas-expansion method, was provided in the parent patent to this invention.

Although more efficient than previous techniques, the strict gas-expansion method, for particular configurations of the attraction/repulsion maps, may not facilitate an efficient expansion into unoccupied space. In the gas-expansion method, agents are "pushed" into unoccupied space by other agents. An agent determines the distance to every other agent with respect to a simple attraction range distance and a repulsion range distance. For each agent, a motion vector is generated, towards the agent if its distance is further than the attraction range and away from the agent if its distance is greater than the repulsion range. These vectors are then combined to form a resultant motion vector. The resulting motion vector in the gas-expansion technique is the sum total "push" of all agents that are observed by the agent that is to move.

A need exists in the art for a technique that more efficiently monitors the pattern or layout of occupied and unoccupied space surrounding the agent to facilitate a more direct and efficient expansion into unoccupied space.

SUMMARY OF THE INVENTION

One embodiment of the present invention is a method for directing the movement of an agent in an environment. The method comprises the steps of determining a first zone and direction to the objects in at least a portion of the environment around the agent. The next step in the method is to determine whether the agent is surrounded by any objects. If the agent is surrounded by objects, the next step of the method will be to keep the agent stationary. However, if the agent is not surrounded by objects, the next step in the method determines whether the closest object is beyond a first zone from the agent. If the closest object is beyond the first zone, the next step in the method will be to move the agent toward a portion of the environment having the greatest object-saturation. If the closest object is within the first zone, the next step in the method will be to move the agent toward a portion of the environment having the least object-saturation.

In a further aspect of the method of the present invention, an additional step takes place when the closest object is within a second zone and where the second zone is within the first zone. In this case, the next step in the method will be to move the agent toward a portion of the environment having the least object-saturation. When the closest object is beyond the second zone, but within the first zone, the next step in the method will be to keep the agent substantially stationary.

In a still further aspect, the method comprises a further step when the closest object is within an immediate zone, and where the immediate zone is within the second zone. In this case the next step of the method will be to perform an adjustment measure with respect to the closest object.

In a still further aspect of the present invention, an additional step of the method occurs wherein the portion of the environment having the least-object saturation is determined by searching for a minimally populated region outside the second zone having a minimum set of objects.

In yet another aspect of the method of the present invention, the environment is a physical space, and wherein the minimally populated region is a minimally populated angular region.

In another aspect of the method of the present invention, the minimally populated angular region must exceed a minimum angular value before the agent moves toward the portion of the environment having the least object-saturation.

In a further aspect of the method of the present invention, the minimally populated angular region is a maximum unoccupied angular region.

In a still further aspect of the method of the present invention, the environment is discretized into bins, and wherein the portion of the environment having the least-object saturation is determined by finding the minimally populated bin.

In another aspect of the method of the present invention, the bins may be combined into super bins, whereby a resolution used for determining the portion of the environment having the least-object saturation may be varied.

In another aspect of the method of the present invention, the portion of the environment having the greatest object-saturation is determined by searching for a populated region outside the first zone having a maximum set of objects.

In another aspect of the method of the present invention, the environment is a physical space, and wherein the populated region is a maximally populated angular region.

In another aspect of the method of the present invention, the maximally populated angular region must be less than a maximum angular value before the agent moves away from the portion of the environment having the greatest object-saturation.

In another aspect of the method of the present invention the environment is discretized into bins, and wherein the portion of the environment having the greatest-object saturation is determined by finding a maximally populated bin with a maximum set of objects.

In another aspect of the method of the present invention the bins may be combined into super bins, whereby a resolution used for determining the portion of the environment having the greatest-object saturation may be varied.

In another aspect of the method of the present invention the adjustment measure is performed by determining a maximally opposite angular direction from the object within the immediate zone and moving the agent a distance in the maximally opposite direction.

In another aspect of the method of the present invention, the objects are classified into multiple classes, and wherein a first zone, a second zone, and an immediate zone are independently assigned to each class.

In another aspect of the method of the present invention, the first zone, the second zone, and the immediate zone are independently adjustable based on at least one characteristic selected from a group consisting of environmental characteristics and task characteristics.

In another aspect of the method of the present invention, the classes of objects include other agents and obstacles.

In another aspect of the method of the present invention, the adjustment measure varies according to the class of object in the immediate zone.

In another aspect of the method of the present invention, the agents are mobile computing devices, and wherein the mobile computing devices move within an environment in at least two dimensions.

In another aspect of the method of the present invention, at least one of the minimally populated angular region and the maximally populated angular region are adjusted based on at least one factor selected from a group consisting of object class, environmental characteristics, and task characteristics.

BRIEF DESCRIPTION OF THE DRAWINGS

These and other features, aspects, and advantages of the present invention will become better understood with regard to the following description, appended claims, and accompanying drawings wherein:

DETAILED DESCRIPTION

Figure 1:
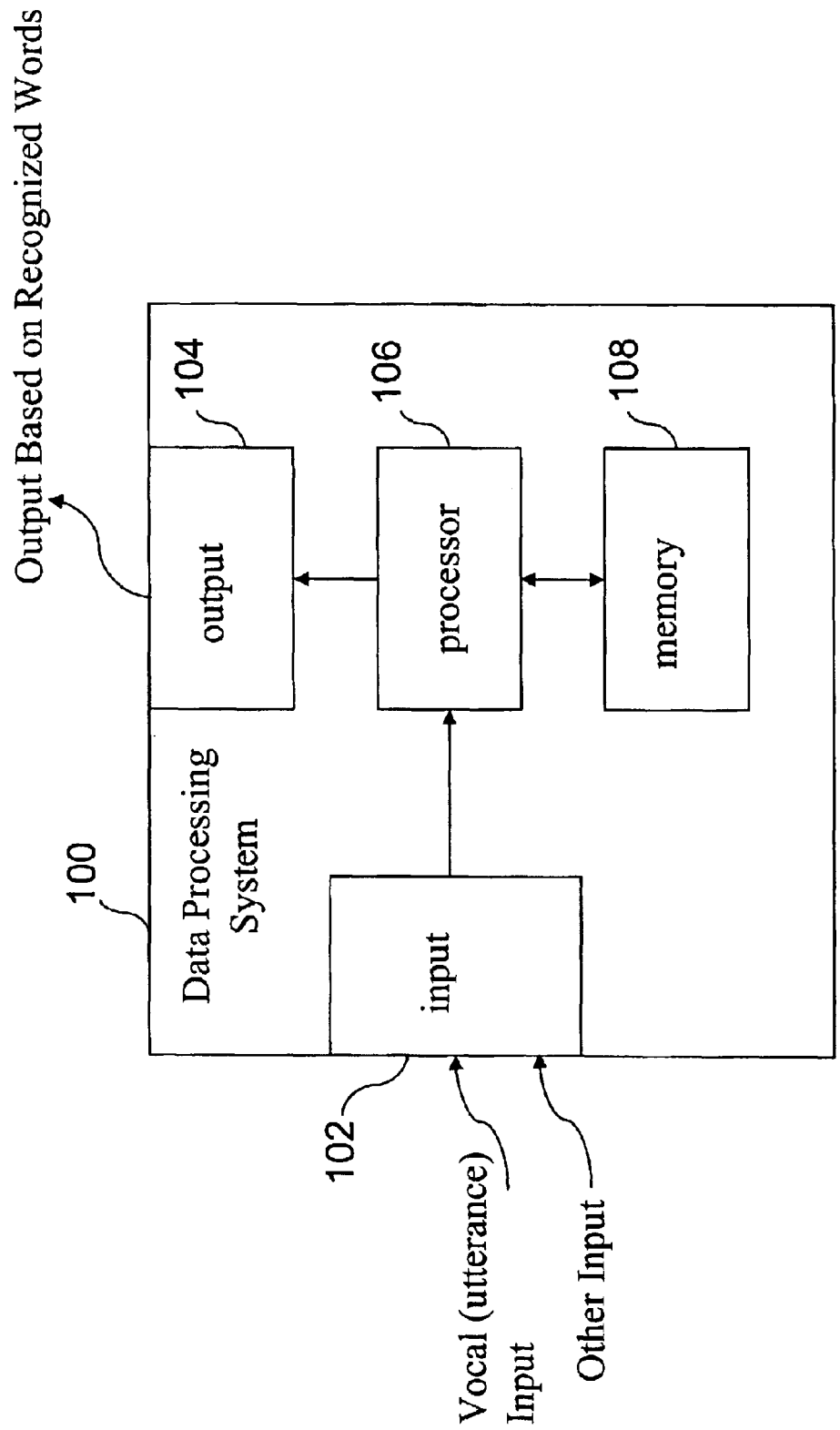
FIG. 1 is a block diagram of a computer system aspect of the present invention.

The present invention is related to the field of controlling movement for large groups of agents in physical and computing environments. More specifically, this disclosure presents a method for controlling the movement of a plurality of agents using low bandwidth communications. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a brief introduction is provided in the form of a narrative description of the present invention to give a conceptual understanding prior to developing the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Agent—As described herein, the term agent indicates a unit comprising, in its most general sense, a processor, a means for detecting distance and direction, and a memory. The agent can also include one or more means for movement and one or more sensors. In more tangible terms, the agent could, for example, be a robot with an infrared transmitter/receiver and a set of wheels, where the infrared transmitter/receiver is used to gage the distances and directions between the robot and other robots. In a more complicated situation, the same robot could also include an antenna for sending and receiving radio communications, a group of sensors for sensing various aspects of the environment (such as temperature, visibility, etc.), and alternate movement means such as wings and a propeller for flying, etc.

Clump of Agents—A clump of agents generally indicates a grouping of agents within a particular region. A specific example definition of a clump of agents is as follows: let a and r be parameters, and let A be an agent. Then, the set C of agents is a "clump" of agents with respect to A if, in the polar coordinate system centered at A, all agents in C lie in at least a portion of a washer shaped region of radius r, centered at A, and every agent in C has an angular distance of at most a from some other agent in C. In this case, the clump of agents lies in a "washer" shaped arc (that is between a minimum and maximum distance threshold from an agent, along an arc)

Environment—An environment is a general term for the area surrounding an agent. Objects such as agents and obstacles reside in the environment. Environmental characteristics may include items such as the following non-limiting examples—the ratio of the volume or area of free space to the total volume or area of the environment, the volume or area of the environment, the atmospheric density, the roughness or softness of a surface on which an agent resides, the ambient temperature, etc. In terms of sensor gathering, as another example, let S be a collection of sensors of the same type. Let C be a collection of object types. For each sensor, s, in S, let d(s) be the distance to the closest object with an object type in C. An environmental characteristic would then be the sum of the d(s).

Low-bandwidth communication—The present invention is designed to provide a simple signaling mechanism for maintaining a predetermined distance between agents. The term low-bandwidth as used herein is synonymous with the use of low bit-rate communications. The present invention assumes that agents are capable of communication through a communication mechanism. In many cases, it is desirable that the communication mechanism use low-bandwidth signaling.

Means for detecting distance and direction—In order to facilitate the movement of agents such that they reside a predetermined distance from each other, they must have a mechanism for determining the distance and direction to other agents. The means for detecting distance and direction can take many forms, non-limiting examples of which include range and direction finders utilizing infrared, sonar, radar, or lasers. The means for detecting distance and direction may also be provided by having the agents transmit a signal with a predetermined amount of power, and using the other agents as receivers, analyzing the signal to determine signal strength, and using the signal strength as a measure of distance. However, the latter method of determining the distance and direction to other agents has a drawback in that other environmental conditions may affect the transmission of the signal, resulting in an undesirable spacing between agents.

Means for providing mobility—In order to move in response to attraction and repulsion, the agents need something to facilitate that movement. Any controllable movement mechanism may be used, as suitable for the environment in which the agent is used. For example, on land, an agent may have legs or wheels, whereas in the air, an agent might have a propeller and wings. On the other hand, in liquid environments, the agent could be equipped with a propeller and fins, where in space, the agent could be equipped with jets or rockets. The means for providing mobility is coupled with, and controlled by, the processor.

Minimum Set of Objects—An area having a minimum set of objects is generally an angular region with the lowest concentration of objects. The objects considered may be those of a particular type or class, or other characteristics may be used to determine those that in the set.

Object—An object in the environment may be another agent or an obstacle. There may be many different classes of agents and obstacles. Examples of objects include biological entities, regions of the environment having a particular set of characteristics (e.g., a pond of water), a vehicle, or any other portion of the environment designated as an object.

Object-Saturation—Object saturation may be defined in a variety of ways, and is generally a measure somewhat analogous to density. Examples of object-saturation measures include average density of objects in a given region, number of objects from a given type or class in a particular region, and the average distance between two objects in a given collection of objects.

Sensors—In addition to the means for detecting distance and direction from other agents, the agents may be equipped with sensors coupled with their processors for collecting information regarding their environment as well as regarding the status of the agent. Non-limiting examples of sensors that may be used with the agents of the present invention include smoke detectors, sound detectors, heat/infrared detectors, chemical sensing devices, and weather sensors. These sensors may be used to provide behavior-triggering events such as used by the mechanism for determining a leader agent in order to direct the movement of other agents.

Software Means—In one context, the term "software means" as used with respect to this invention generally indicates a set of operations to be performed on a computer, and may represent pieces of a whole program or individual, separable, software modules. Non-limiting examples of "software means" include computer program code (source or object code) and "hard-coded" electronics (i.e. computer operations coded into a computer chip). The "software means" may be stored in the memory of a computer or on a computer readable medium. In another context, the term "software means" is used with hardware components to indicate a device that produces the function of the "software means."

Surrounded—Surrounded is an indicator that an area around an agent is occupied by objects. An example definition is as follows: let $\alpha$ and r be parameters. In this case, an agent is surrounded if, in the polar coordinate system centered at the agent, there is no open wedge (angular region) that has radius r and an angle greater than $\alpha$. As another example, let A be an object and let D be a parameter. Let LE denote the subset of the environment such that a point p is in LE iff p has distance at most D from A. Let O be a collection of object types. Let P be a partition of LE such that A meets the boundary of every partition element. Then A is surrounded relative to P and O if the interior of every partition element in P intersects an object having an object type in O. Note that the definition of surrounded may vary according to the dimensionality of the space inhabited by the agent, and that the dimensions used by the system may be a subset of the total dimensionality of the environment, as will be appreciated by one of skill in the art.

Task Characteristics—Task characteristics are metrics related to the task to which an agent is devoted. Non-limiting examples of task characteristics may include, the size of the environment to be covered, the average speed at which the agents move, the maximum speed at which the agents move, and the reason for agent coverage of the environment (e.g., to monitor movement of biological entities, to monitor environmental chemical composition, to seek out and destroy a particular class of objects in the environment).

(2) Introduction

The invention provides for a method, apparatus, and computer program product for controlling the dispersal of a swarm of agents into an environment. The agents may, for example, take the form of mobile computer code operating in a computing environment or physical robot-type agents operating in a physical environment. Generally, the movement during dispersal is controlled by observing the pattern of empty and occupied portions of the region around the agent. Each agent in a group of agents observes patterns of occupancy (i.e., in the case of robots operating in a physical environment, a portion of the environment is considered occupied if it contains part of an obstacle or robot) occurring in the area surrounding it. Occupants are collectively referred to as objects. In the case of robots, an agent generates a motion vector based on the observed pattern and moves either toward or away from other objects in the environment. Depending on the particular manifestation of the invention, an agent may also remain static in some cases. If an agent is within a certain distance of another agent or an obstacle, then it moves into the largest wedge of contiguous open space that it senses in the space surrounding it. If, on the other hand, the agent senses that it is too far from all other agents, then it moves towards the largest "clump" of agents that it senses. The net result of this behavior is that, the agents disperse fairly uniformly over an area. The dispersal behavior could be used in scenarios when it is desirable for agents to spread to cover at least a portion of the environment in which they are placed. The coverage depends on the number of agents involved as well as on the permissible separation between agents.

Thus, the present invention provides a mechanism by which a swarm of agents is expanded into an environment with respect to adjustable inter-agent spacing parameters. Agents on the edge of the swarm move forward into unoccupied areas of the environment and effectively pull out the agents behind them. In actively seeking the largest open space toward which to move, an improved expansion is achieved, with less oscillation than is exhibited by pure gas expansion models.

Next, various "physical" aspects or manifestations of the present invention are presented, including descriptions of a computer system/robot, a computer program product, and mobile code.

(3) Physical Aspects

The present invention has three principal "physical" aspects. The first is a system for controlling agent movement, typically in the form of a computer system operating software or in the form of a "hard-coded" instruction set. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. The computer system as described may be applied as a component as a robot-type agent, as described relative to FIG. 3, or the computer system may be remote from the agents and may control them as a group, thus centralizing the processing for the agents.

A block diagram depicting the components of a computer system used in the present invention is provided in FIG. 1. The data processing system 100 comprises an input 102 for receiving sensor data as well as other instructions such as user instructions. Note that the input 102 may include multiple "ports". Typically, input is received from a sensor suite including multiple sensors. An (optional) output 104 is connected with the processor for providing sensed or other information to users. Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
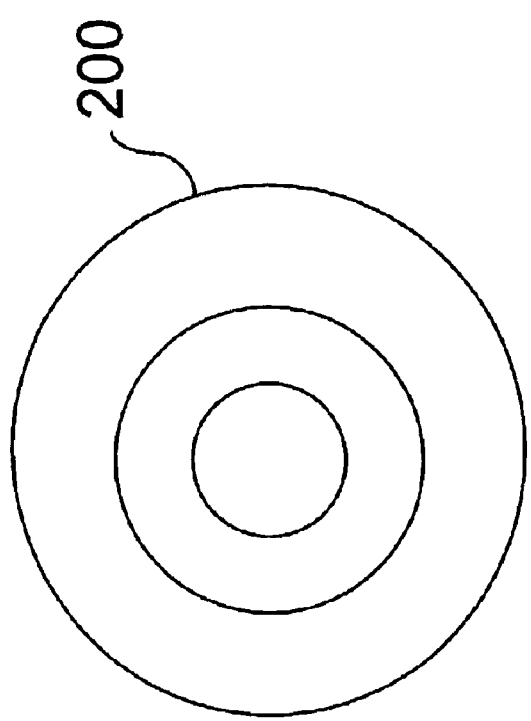
FIG. 2 is an illustration of a computer program product aspect of the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

Figure 3:
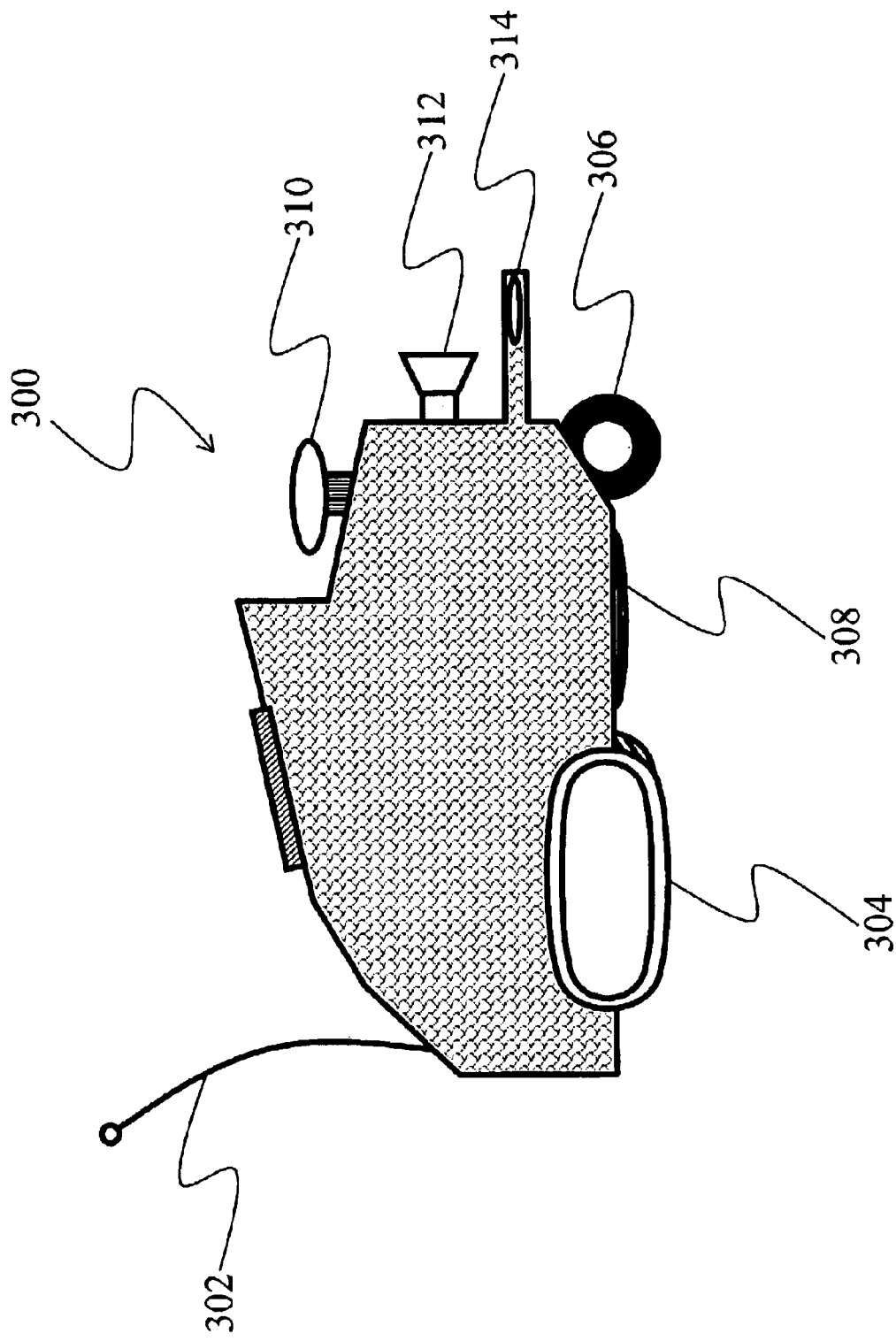
FIG. 3 is an illustration of a robot-type agent of the present invention.

As illustratively depicted in FIG. 3, agents 300 used with the present invention can also take the form of small robots having a communication capability 302, a mobility means such as a set of tracks 304, a set of wheels 306, or wings, propellers, etc. (not shown), or a combination thereof, depending on the needs of the particular environment (e.g., agents for use in liquid mediums such as water could use propellers and fins to move). The mobility means is connected with a processor, which controls the mobility means. The processor, in turn, is connected with a memory, and may take the form of a specific purpose processor, or may be a general purpose processor utilizing software for controlling the various functions of the agent. The agents may be equipped with a means for measuring the distance and direction from any other local agent. In this aspect, the means may take any useful form known in the art. For example, actively transmitting a signal and then sensing when it bounces off other objects, as in sonar or laser range finding. Alternatively, any passive means of detecting radiations from objects, such as heat, may be used. In one embodiment, each agent may send periodic omni directional signals via infrared transmitters, and the other agents sense the signals using infrared receivers, estimating the distance by the loss of signal strength.

Below, the various activities performed by the agents are described. The activities are typically implemented by use of software in conjunction with the memory and processor in the agents. Optionally, the operations may also be encoded in hardware, rather than software. As shown, the agent 300 includes various other sensors, such as a metal detector 308, an infrared transmitter/receiver or rangefinder 310, a video camera 312, and a gas chromatograph 314. These or other sensors may be incorporated into the agent and connected with the processor in order to provide useful data for other processes.

Next more specific details of the operations of the present invention are provided.

(4) Discussion

The present invention provides a technique for expanding a plurality of agents over an area with less oscillation than is obtained with previous methods.

The mechanism of controlling motion via observing open/closed patterns in the surrounding environment reduces the amount of computation that an agent must carry out. This mechanism can be used to eliminate mathematical computation from many behaviors. It can reduce the determination of a desirable action to the relatively simple process of examining a sequence of conditional statements. The result of these conditional statements is determined by the patterns that are observed. As will be appreciated by one of skill in the art, various modifications to parameters used to facilitate the conditional statements may be made to provide varying desirable dispersal patterns.

The basic idea behind the method of dispersal taught by the present invention is that movement is controlled by the pattern of empty and occupied space that is observed around the robot. In this method, each agent observes the patterns of occupancy (a portion of space is considered to be occupied if it contains part of an object—typically an obstacle or robot) occurring in the area surrounding it. The agent then generates a motion vector that is determined by the observed patterns. If an agent is within a certain distance of another agent or an obstacle, then it moves into the largest wedge of contiguous open space that it senses in the space surrounding it. If, on the other hand, the agent senses that it is too far from all other agents, then it moves towards the largest "clump" of agents that it senses. In this behavior, the result is that the agents disperse fairly uniformly over an area.

In one aspect, the dispersal technique of the present invention uses four distance parameters, as described below. It is important to note, however, that other distance parameters may be used without departing from the present invention. At minimum, however, one distance parameter must be provided to divide the environment into areas where the agent is pulled toward and pushed away from other agents. Referring to the case where four distance parameters are provided, the distance parameters are described as "zones." Each zone can be of any desired shape, or may consist merely of a distance measure. The present invention may be operated in an environment including any number of dimensions. In the particular example described here, for simplicity of explanation, the invention will be cast in terms of an environment where mobile robots act as agents with the ability to move in two dimensions.

Figure 4:
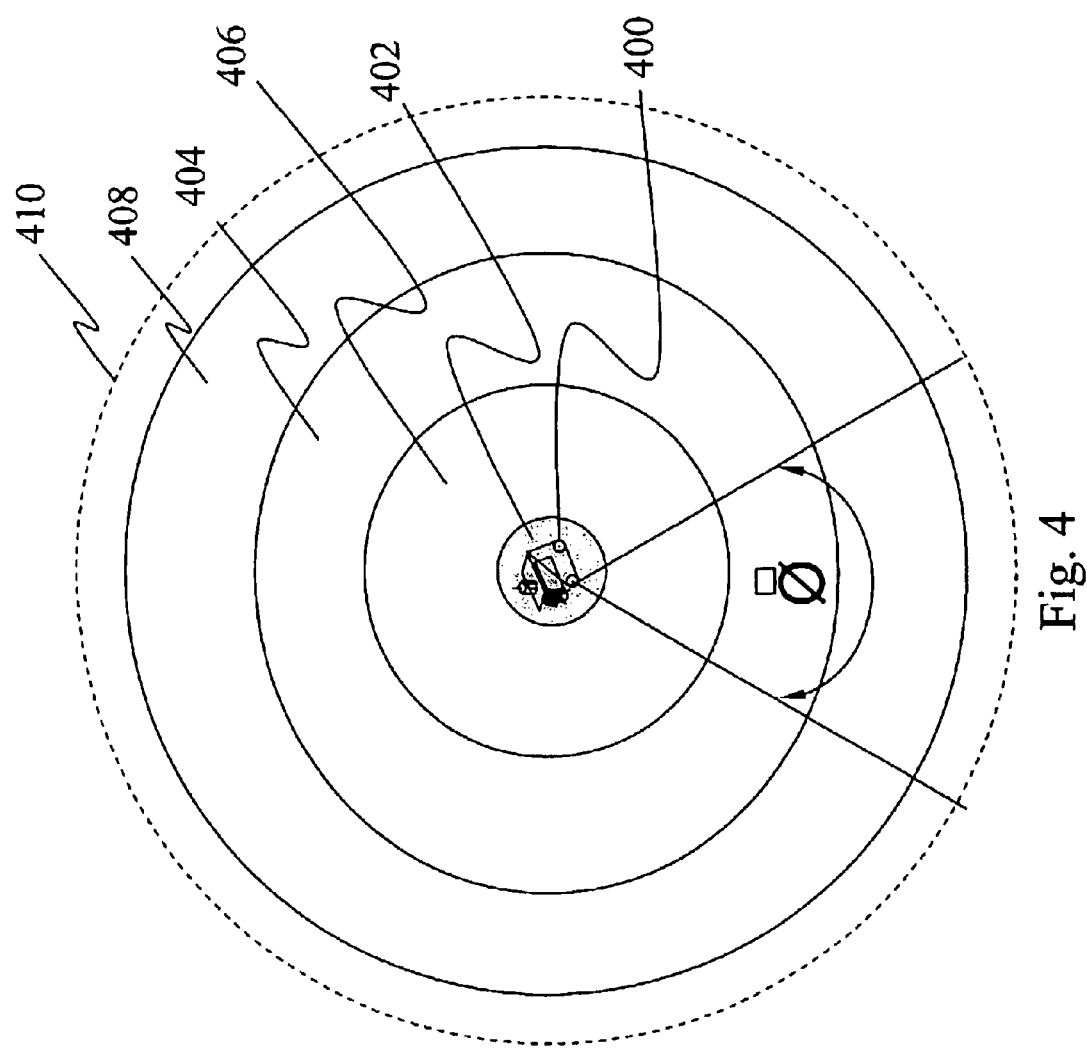
FIG. 4 is an illustration of an agent surrounded by various zones as taught by the present invention.

An illustrative representation of this situation, along with four zones is provided in FIG. 4. The zones may be thought of as including the following parameters with the following relationships: Immediate Zone<Lower Bound Distance Parameter<Front Distance Parameter<Upper Bound Distance Parameter<The maximum range at which an agent can detect another agent or obstacle. If an agent is closer than the Lower Bound Distance Parameter to some obstacle or agent, it finds the largest open wedge and, if this wedge is large enough, the agent moves into it. In the polar coordinate system centered at the agent, the agent finds the largest interval, in (e.g., degrees) theta, in which it senses no obstacle or agent that is closer than the Front Distance Parameter. If the size of this wedge is larger than a Minimum Theta Parameter (described below), the agent moves in the direction of the theta value that lies in the middle of this interval. If, on the other hand, an agent is further than the Upper Bound Distance Parameter from any other agent it finds the largest closed wedge of agents that are not blocked by obstacles and moves into it. In the polar coordinate system centered at the agent, the agent finds the largest interval, in theta, in which it senses one or more robots that have no obstacle blocking them. The agent then moves in the direction of the theta value that lies in the middle of this interval.

An additional parameter, the immediate zone (typically a danger zone) may be provided. If the agent senses that an obstacle or agent lies within immediate zone, then the agent takes an adjustment measure such as moving directly away from the sensed obstacle or agent.

These distances, which form regions termed "zones," are not strictly limited by the relationship described. For example, where the zones are not circular or spherical, although the relationship applies for corresponding parts of the parameters (e.g., at every point, the immediate zone is within the perimeter formed by the lower bound distance), the relationship may not be absolutely true when comparing different parts of each parameter. Thus, the areas created by the parameters are referred to as zones, as described here with respect to the illustrative representation of the situation shown in FIG. 4. An agent 400 determines the distances and directions to objects around the agent, and determines whether it is surrounded so that it cannot move. Nearest the agent 400, an immediate zone 402 is provided. The immediate zone 402 is typically used as a limit on how close the agent 400 is able to approach an object. In the case where an object approaches an agent 400 to within the immediate zone 402, the agent typically performs an adjustment measure with respect to the object. Depending on the needs of a particular embodiment, and possibly depending on the nature of the object, the agent 400 may evade the object by determining the most opposite free direction (assuming that a free direction exists) away from the object and moving in that direction (e.g., 180 degrees from the object if no other object would block the agent's movement). Other actions may be taken by the agent 400 with respect to the object. As a non-limiting example, the agent 400 could take defensive measures to eliminate any threat from the object.

A first zone 404 is also provided, enclosing an area about the immediate zone 402. The first zone 404 may be provided with or without an immediate zone 402, and may, in fact, be the only zone provided. In the case where the first zone 404 is the only zone provided, it serves as a threshold for push/pull of the agent 400. If the agent 400 is surrounded by objects, it generally remains stationary. If it is not surrounded by objects, the agent 400 determines whether the closest object is within or beyond the boundary of the first zone 404. If the closest object is beyond the first zone 404, the agent 400 moves toward a portion of the environment having the greatest object-saturation, and if the closest object is within the first zone 404, the agent moves toward a portion of the environment having the least object-saturation. Note also that the first zone 404 may be divided into two portions, one which serves as an inner boundary so that only objects within the inner boundary counted for moving toward the portion of the environment with the least object-saturation. In this case, the other portion serves as an outer boundary so that only objects outside the outer boundary are counted for moving the agent toward the portion of the environment having the greatest object saturation.

Within the first zone 404, a second zone 406 may be provided. In this situation, when the closest object is within the second zone 406, moving the agent 400 toward a portion of the environment having the least object-saturation, and when the closest object is beyond the second zone 406, but within the first zone 404, keeping the agent 400 substantially stationary. Thus, in this situation, the area within the second zone 406 acts as a repulsive region, the area enclosed between the boundaries of the first zone 404 and the second zone 406 acts as a neutral region, and the outside area 408, beyond the boundary of the first zone 404, acts as an attractive region. An agent 400 range boundary 410 is also shown, representing the effective sensor range of the agent 400. The area beyond the range boundary 410 generally acts as a neutral region with respect to the agent 400, since objects beyond do not have an immediate impact on the actions of the agent 400.

The object-saturation may be determined by any desired mechanism. For example, the portion of the environment having the least object-saturation may be determined by searching for a minimally populated region outside the second zone 406 having a minimum set of objects. The minimally populated region can be determined angularly, using an angle $\theta_{minpop}$ representing an angular region about the agent 400, where $\theta_{minpop}$ must be greater than a minimum angular value for the agent 400 to move, and where the minimally populated region is a minimally populated angular region in the environment around the agent 400. This search may be performed by searching for an angular region that has a minimum object density above a particular threshold. The angular region may also be defined as the maximum unoccupied angular region about the agent (assuming that the unoccupied region exceeds a minimum angular value). The angle $\theta_{minpop}$ generally describes the amount of open space the agent must sense before it moves, and is (as mentioned before) also termed the Minimum Theta Parameter. If this parameter is set to zero, it is as if the parameter does not exist.

As will be described further herein, the environment may be discretized into bins or angular sectors around an agent 400 such that the sum of the angular bins (in the case of a two dimensional movement pattern) is 360 degrees. In this case, the portion of the environment having the least-object saturation is determined by searching for the minimally populated bin. In another aspect, bins may be combined so that a resolution used for determining the portion of the environment having the least object-saturation may be varied.

Similarly, the portion of the portion of the environment having the greatest object-saturation may be determined by searching for a populated region outside the second zone 406 having a maximum set of objects. The maximally populated region can be determined angularly, using an angle $\theta_{maxpop}$ representing an angular region about the agent 400, where $\theta_{maxpop}$ must be less than a maximum angular value for the agent 400 to move as a result, and where the minimally populated region is a minimally populated angular region in the environment around the agent 400. This search may be performed by searching for an angular region that has a maximum object density above a particular threshold.

As with the search for the portion of the environment having the least object-saturation, in this case, the environment may be discretized into bins or angular sectors around an agent 400 such that the sum of the angular bins (in the case of a two dimensional movement pattern) is 360 degrees. In this case, the portion of the environment having the greatest object-saturation is determined by searching for the maximally populated bin. In another aspect, bins may be combined so that a resolution used for determining the portion of the environment having the greatest object-saturation may be varied.

Figure 5:
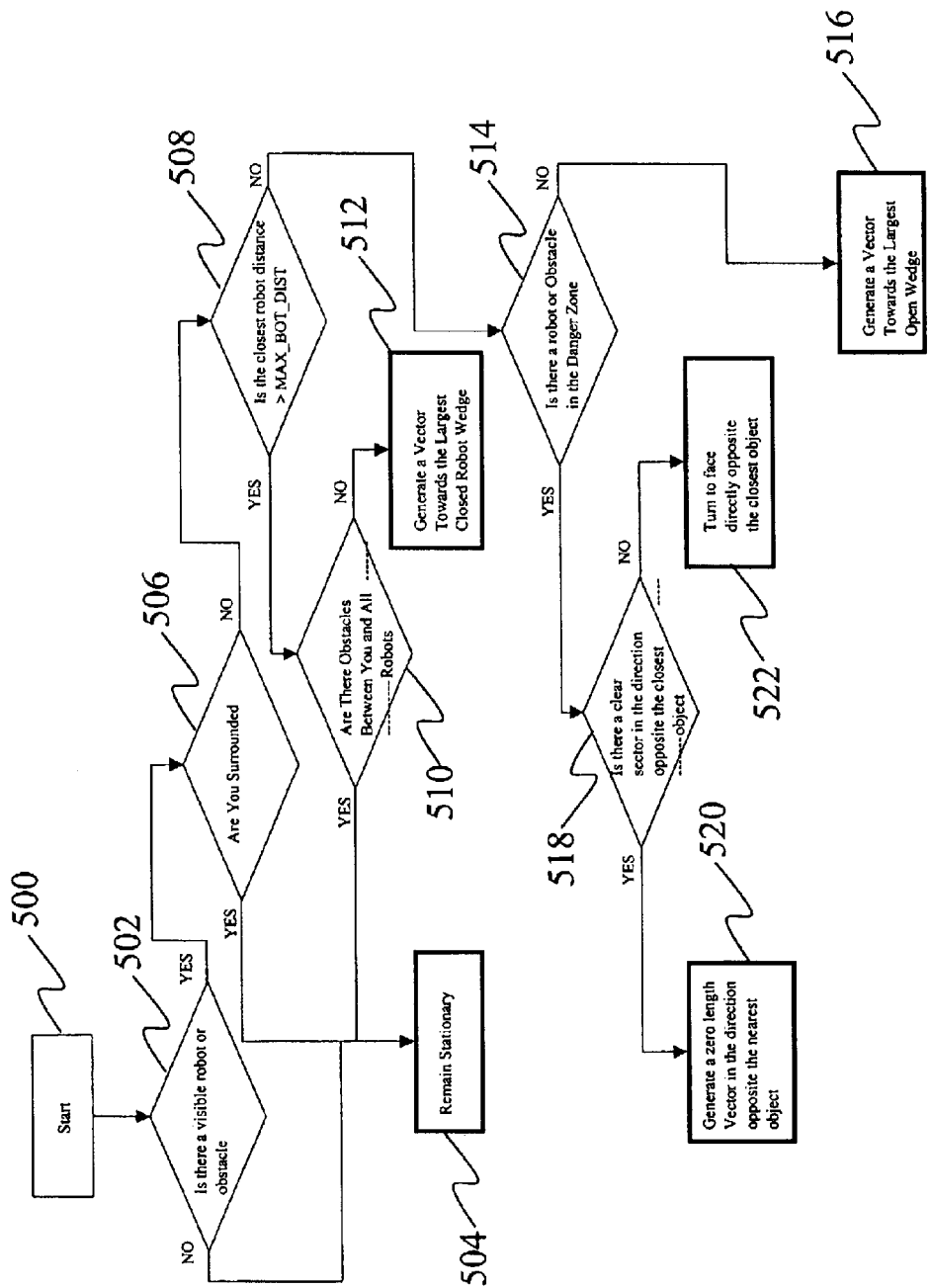
FIG. 5 is a flowchart depicting the relationship of various operations of the present invention.

In another aspect, the first zone, the second zone, and the immediate zone may be configured differently for different classes of objects, creating an object-type profile. For example, in the case of objects in the form of robots (agents), one class of robots may have sensors with a greater range than another class. Thus, the push/pull regions for each class of robots may be varied to ensure complete sensor coverage. Similar classes of objects may be applied in cases where the objects are obstacles, and may be based on the relative prospective danger of each class (type) of object. The different zones may be assigned independently for each class, and may also be independently adjustable based on environmental and task characteristics, as well as the particular class to which they apply. The angles, $\theta_{minpop}$ and $\theta_{maxpop}$ can also be adjusted based on these factors. Note that the above discussion assumes that a polar coordinate system is used about an agent, though as will be appreciated by one of skill in the art, any other desirable coordinate system may be used;

Next, a flow chart depicting operations of the present invention is shown in FIG. 5. After the start 500 of the operations, the agent 400 determines whether there are objects present in its surrounding environment 502. If there are no objects in the surrounding environment, the agent 400 remains stationary 504. If there are objects in the surrounding environment, the agent 400 next checks to determine whether it is surrounded by objects 506. If the agent 400 is surrounded, it remains stationary 504. If, on the other hand, the agent 400 is not surrounded, it determines the distance of the closest object 508—in the case shown in the figure, the object is another agent. If the object (agent) is outside the first zone, then the agent 400 determines whether there are other objects (obstacles) between the agent 400 and the other agent 510. If there are, the agent 400 remains stationary 504. If nothing is between the agent 400 and the other agent, the agent generates a vector toward the area (wedge) having the greatest object-saturation and moves along the vector toward the area 512. On the other hand, if, after determining the distance of the closest object 508, it is determined that the object is not outside the first zone, then the agent 400 determines whether the object is in the immediate zone 514. If the object not in the immediate zone, the agent 400 generates a vector toward the largest open wedge among the objects in the environment and moves in the direction of the open wedge 516. If, on the other hand, the object is in the immediate zone, the agent 400 determines an appropriate adjustment measure to perform. For example, the agent 400 may make a determination regarding whether there is a clear region in a direction (as close to opposite as possible) away from the object into which it can move 518. In this case, if there is a clear region, the agent 400 generates a vector in the direction of the clear region and moves in that direction 520. On the other hand, if there is no clear region (e.g., the agent 400) is surrounded, the agent 400 can take an alternative adjustment measure, such as, in this case, turning to face away from the object 522.

The operations just described may be implemented using operations modeled after the following pseudocode:

```
IF there is no sensed agent or obstacle
    THEN set the return vector to NULL and RETURN;
[remain stationary]
END IF;
ELSE
    IF you are surrounded
        THEN set the return vector to NULL and RETURN; [remain stationary]
        END IF;
    ELSE
        IF (distance to the closest agent) > (Upper Bound Distance)
        IF (no agent is sensed) OR (every sensed agent is blocked by an obstacle)
            THEN set the return vector to NULL and RETURN [remain stationary];
            END IF;
        ELSE
            Generate a vector towards the largest "clump" of agents sensed and
            RETURN; (move back towards the group)
        END ELSE;
    END IF;
    ELSE
        IF (distance to some agent or obstacle) < (Danger Zone Distance)
            Generate a zero length vector towards the direction opposite the closest agent or Obstacle;
            IF there is enough space in the vector direction
                Give the vector an "appropriate" nonzero length and
                RETURN; [move directly away from the closest object]
```

```
        -continued

END IF;
    ELSE
        RETURN; [turn directly away from the closest
object and remain stationary]
        END ELSE;
    END IF;
    ELSE
        Generate a vector towards the largest contiguous wedge
of "open space" and
            RETURN; (move towards open space)
        END ELSE;
    END ELSE;
  END ELSE;
END ELSE;
```

Figure 6:
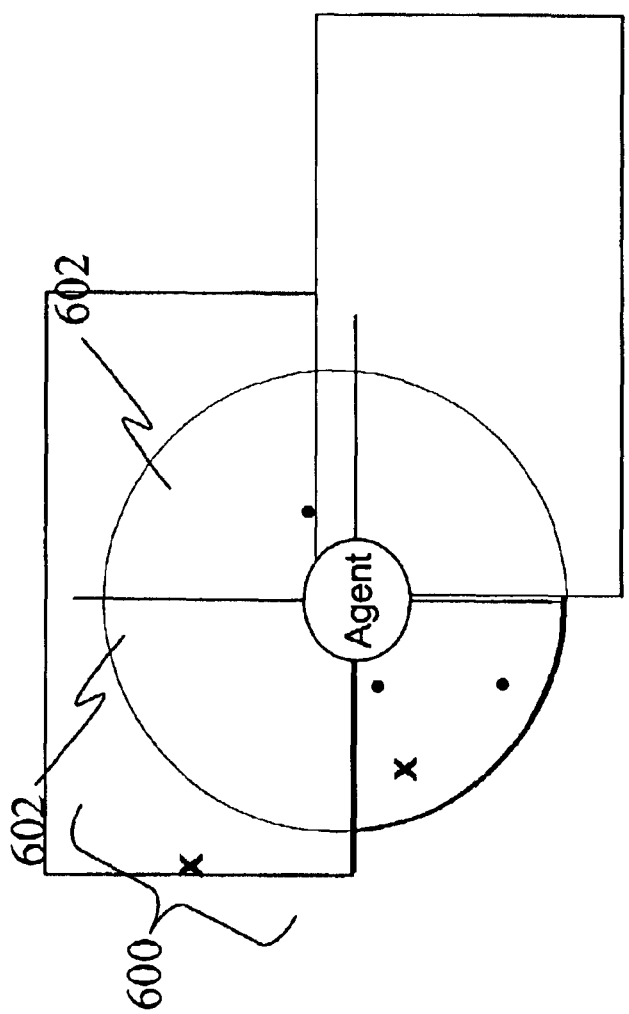
FIG. 6 is an illustration of the discretization of space surrounding an agent into a bin representation, as taught by the present invention.

The present invention may also be tailored to use a sector/bin-type data structure to represent the different angular regions (as well as different portions of the zones). In this case, which is shown illustratively in FIG. 6, and which was previously mentioned, the data structure induces a discretization of space surrounding the agent 400, in a manner that is representative of the agent's sensor layout. Utilizing this data structure, which in the case shown discretizes space in a polar representation, observations of the patterns of empty and occupied space can be made with respect to varying resolutions of r and theta.

This data structure provides each agent 400 with its own local dynamic representation of the free space surrounding it. It consists of a bin-type storage structure/object 600 and a few simple primitive methods that operate on the bins object. The bin storage structure 600 is subdivided into a plurality of bins 602. The features of the bins 602 are discussed in greater detail below.

In the example shown, a two-dimensional space surrounding an agent 400 is partitioned into equally-sized "pie-like" sectors (bins) 602 with the agent 400 at the center. Although shown as equally-sized "pie-like" shapes, each bin 602 can be of any desired shape and are not necessarily equal in size.

In one aspect, given an input list of objects that the agent 400 detects, each bin 602 stores the detected distance to an object of minimum distance from the agent 400 in that bin. In addition, minimal and/or maximal thresholds may be imposed, so if a distance is larger or smaller than specified threshold values, then it is not considered.

This representation may, for example, be implemented as a computer program class that contains a bins object and associated methods. In implementation, a "bins" object can simply be an array of integers, where the array length is the number of bins. Each array element corresponds to a bin 602 and stores a distance as an integer.

Using this structure, an area around the agent 400 is decomposed into a number of sectors/bins 602 and the resulting object is maintained as a data structure. This is the bins data structure. This data structure stores the distance to the closest obstacle or agent sensed in each bin 602. The bins representation may have additional threshold parameters associated with it. For example, instead of just storing the distance to the closest agent or obstacle in each sector, there may be an upper bound threshold for each bin 602. In this case, the distance to the closest obstacle or agent is stored for that bin 602 only if it is smaller than the upper bound threshold. Otherwise the bin 602 would be considered to be empty. There may also be a lower bound threshold. In this case, the distance to the closest obstacle or agent is stored for that sector only if it is larger than the lower bound threshold. Otherwise the sector would be considered to be empty.

An agent 400 may maintain multiple "bin" representations. Different bin representations may have different thresholds associated with them. Different bin representations may also be used for different types of obstacles or agents. For example, there may be a bin representation for obstacles, another representation for sensed signals from other agents of type A, and yet another representation for sensed signals from other agents of type B. This concept was previously discussed regarding the use of different profiles for different classes of objects.

There are a variety of advantages provided by discretizing the environment around an agent 400. For example, computation is less intensive and a particular behavior or environment may not require precise motion or sensing. Also, there is normally error in agent movement and sensing, so that precise motion or sensing is impracticable. The fineness (resolution) of the discretization can be tailored to the fineness of motion control and sensing ability. In a case where there are large amounts of error in agent sensing and movement, using a non-discretized representation of space may actually be detrimental. For example, the amount of error may be such that what the agent perceives as an open space may actually be occupied. The coarseness of the discretization can be adjusted to compensate for this, so that what is perceived as a small open space in the non-discretized representation would be perceived as occupied in the discretized version. This adjustment is implicitly encoded in the representation so that many special cases do not have to be explicitly considered every time a computation is done or an observation is made.

Also, in making use of an adjustable discretized representation of space, as mentioned previously, the dispersal of agents can be tailored to the motion and sensing capabilities of particular agent types or classes. In making use of a representation of space that is specifically formulated to maximize perceptual ability with respect to particular agent sensors used for a given task, agents are less prone to error in choosing actions to carry out. In making use of a representation of space that is specifically formulated to take into account errors in agent motion, the actuation of the behavior is less prone to disruption by errors made in carrying out the behavior.

In addition, this structure allows for a multi-resolution representation of space and enables the agent to efficiently access the appropriate resolution depending upon its environment and task. Such a representation also allows for ease of parameter adjustment in the case that agent learning occurs.

What is claimed is:

1. A method for directing movement of an agent in an environment, the method comprising steps of:
    determining a first zone within the environment surrounding an agent and directions to any objects in at least a portion of the environment around the agent;
    determining whether the agent is surrounded by objects, and if the agent is surrounded by objects, keeping the agent stationary;
    if the agent is not surrounded by objects, determining whether a closest object is beyond a first zone from the agent; and
        if the closest object is beyond the first zone, moving the agent toward a portion of the environment having a greatest object-saturation; and
        if the closest object is within the first zone, moving the agent toward a portion of the environment having a least object-saturation.

2. A method as set forth in claim 1, comprising a further step of, when the closest object is within a second zone, where the second zone is within the first zone, moving the agent toward a portion of the environment having the least object-saturation, and when the closest object is beyond the second zone, but within the first zone, keeping the agent substantially stationary.

3. A method as set forth in claim 1, comprising a further step of, when the closest object is within an immediate zone, where the immediate zone is within a second zone, of performing an adjustment measure with respect to the closest object.

4. A method as set forth in claim 2, comprising a further step of, when the closest object is within an immediate zone, where the immediate zone is within the second zone, of performing an adjustment measure with respect to the closest object.

5. A method as set forth in claim 4, wherein the portion of the environment having the least-object saturation is determined by searching for a minimally populated region outside the second zone having a minimum set of objects.

6. A method as set forth in claim 5, wherein the environment is a physical space, and wherein the minimally populated region is a minimally populated angular region.

7. A method as set forth in claim 6, wherein the minimally populated angular region must exceed a minimum angular value before the agent moves toward the portion of the environment having a least object-saturation.

8. A method as set forth in claim 7, wherein the minimally populated angular region is a maximum unoccupied angular region.

9. A method as set forth in claim 5, wherein the environment is discretized into bins, and wherein the portion of the environment having the least-object saturation is determined by finding the minimally populated bin.

10. A method as set forth in claim 9, wherein the bins may be combined into super bins, whereby a resolution used for determining the portion of the environment having the least-object saturation may be varied.

11. A method as set forth in claim 8, wherein the portion of the environment having a greatest object-saturation is determined by searching for a populated region outside the first zone having a maximum set of objects.

12. A method as set forth in claim 11, wherein the populated region is a maximally populated angular region in a physical space.

13. A method as set forth in claim 12, wherein the maximally populated angular region must be less than a maximum angular value before the agent moves away from the portion of the environment having a greatest object-saturation.

14. A method as set forth in claim 13, wherein the environment is discretized into bins, and wherein the portion of the environment having the greatest-object saturation is determined by finding a maximally populated bin with a maximum set of objects.

15. A method as set forth in claim 14, wherein the bins may be combined into super bins, whereby a resolution used for determining the portion of the environment having the greatest-object saturation may be varied.

16. A method as set forth in claim 13, where the adjustment measure is performed by determining a maximally opposite angular direction from the object within the immediate zone and moving the agent a distance in the maximally opposite direction.

17. A method as set forth in claim 16, where objects are classified into multiple classes, and wherein a first zone, a second zone, and an immediate zone are independently assigned to each class.

18. A method as set forth in claim 17, wherein the first zone, the second zone, and the immediate zone are independently adjustable based on at least one characteristic selected from a group consisting of object class, environmental characteristics, and task characteristics.

19. A method as set forth in claim 18, wherein the classes of objects include other agents and obstacles.

20. A method as set forth in claim 19, wherein the adjustment measure varies according to the class of object in the immediate zone.

21. A method as set forth in claim 20, wherein the agents are mobile computing devices, and wherein the mobile computing devices move within an environment in at least two dimensions.

22. A method as set forth in claim 21, wherein at least one of the minimally populated angular region and the maximally populated angular region are adjusted based on at least one factor selected from a group consisting of object class, environmental characteristics, and task characteristics.

23. A method as set forth in claim 1, wherein the portion of the environment having the least-object saturation is determined by searching for a minimally populated region outside the first zone having a minimum set of objects.

24. A method as set forth in claim 23, wherein the environment is a physical space, and wherein the minimally populated region is a minimally populated angular region.

25. A method as set forth in claim 24, wherein the minimally populated angular region must exceed a minimum angular value before the agent moves toward the portion of the environment having a least object-saturation.

26. A method as set forth in claim 25, wherein the minimally populated angular region is a maximum unoccupied angular region.

27. A method as set forth in claim 26, wherein at least one of the minimally populated angular region and the maximally populated angular region are adjusted based on at least one factor selected from a group consisting of object class, environmental characteristics, and task characteristics.

28. A method as set forth in claim 23, wherein the environment is discretized into bins, and wherein the portion of the environment having the least-object saturation is determined by finding the minimally populated bin.

29. A method as set forth in claim 28, wherein the bins may be combined into super bins, whereby a resolution used for determining the portion of the environment having the least-object saturation may be varied.

30. A method as set forth in claim 1, wherein the portion of the environment having a greatest object-saturation is determined by searching for a populated region outside the first zone having a maximum set of objects.

31. A method as set forth in claim 30, wherein the environment is a physical space, and wherein the populated region is a maximally populated angular region.

32. A method as set forth in claim 31, wherein the maximally populated angular region must be less than a maximum angular value before the agent moves away from the portion of the environment having a greatest object-saturation.

33. A method as set forth in claim 32, wherein at least one of the minimally populated angular region and the maximally populated angular region are adjusted based on at least one factor selected from a group consisting of object class, environmental characteristics, and task characteristics.

34. A method as set forth in claim 30, wherein the environment is discretized into bins, and wherein the portion of the environment having the greatest-object saturation is determined by finding a maximally populated bin with a maximum set of objects.

35. A method as set forth in claim 34, wherein the bins may be combined into super bins, whereby a resolution used for determining the portion of the environment having the greatest-object saturation may be varied.

36. A method as set forth in claim 1, comprising a further step of, when the closest object is within an immediate zone, where the immediate zone is within the first zone, of performing an adjustment measure with respect to the closest object, where the adjustment measure is performed by determining a maximally opposite angular direction from the object within the immediate zone and moving the agent a distance in the maximally opposite direction.

37. A method as set forth in claim 1, where objects are classified into multiple classes, and wherein the first zone is independently assigned to each class.

38. A method as set forth in claim 37, wherein the first zone is adjustable based on at least one characteristic selected from a group consisting of object class, environmental characteristics, and task characteristics.

39. A method as set forth in claim 38, wherein the classes of objects include other agents and obstacles.

40. A method as set forth in claim 1, comprising a further step of, when the closest object is within an immediate zone, where the immediate zone is within the first zone, of performing an adjustment measure with respect to the closest object, wherein the adjustment measure varies according to the class of object in the immediate zone.

41. A method as set forth in claim 1, wherein the agents are mobile computing devices, and wherein the mobile computing devices move within an environment in at least two dimensions.

42. A computer program product for directing movement of an agent in an environment, the computer program product comprising means, operable in a computer system of an agent and encoded in a computer readable medium, for:
determining a first zone within the environment surrounding an agent and directions to any objects in at least a portion of the environment around the agent;
determining whether the agent is surrounded by objects, and if the agent is surrounded by objects, keeping the agent stationary;
if the agent is not surrounded by objects, determining whether a closest object is beyond a first zone from the agent; and
if the closest object is beyond the first zone, moving the agent toward a portion of the environment having a greatest object-saturation; and
if the closest object is within the first zone, moving the agent toward a portion of the environment having a least object-saturation.

43. A computer program product as set forth in claim 42, comprising a further means for, when the closest object is within a second zone, where the second zone is within the first zone, moving the agent toward a portion of the environment having the least object-saturation, and, when the closest object is beyond the second zone, but within the first zone, keeping the agent substantially stationary.

44. A computer program product as set forth in claim 42, comprising a further means for, when the closest object is within an immediate zone, where the immediate zone is within the first zone, of performing an adjustment measure with respect to the closest object.

45. A computer program product as set forth in claim 43, comprising a further means for, when the closest object is within an immediate zone, where the immediate zone is within the second zone, of performing an adjustment measure with respect to the closest object.

46. A computer program product as set forth in claim 45, wherein the portion of the environment having the least-object saturation is determined by searching for a minimally populated region outside the second zone having a minimum set of objects.

47. A computer program product as set forth in claim 46, wherein the environment is a physical space, and wherein the minimally populated region is a minimally populated angular region.

48. A computer program product as set forth in claim 47, wherein the minimally populated angular region must exceed a minimum angular value before the agent moves toward the portion of the environment having a least object-saturation.

49. A computer program product as set forth in claim 48, wherein the minimally populated angular region is a maximum unoccupied angular region.

50. A computer program product as set forth in claim 46, wherein the environment is discretized into bins, and wherein the portion of the environment having the least-object saturation is determined by finding the minimally populated bin.

51. A computer program product as set forth in claim 50, wherein the bins may be combined into super bins, whereby a resolution used for determining the portion of the environment having the least-object saturation may be varied.

52. A computer program product as set forth in claim 49, wherein the portion of the environment having a greatest object-saturation is determined by searching for a populated region outside the first zone having a maximum set of objects.

53. A computer program product as set forth in claim 52, wherein the environment is a physical space, and wherein the populated region is a maximally populated angular region.

54. A computer program product as set forth in claim 53, wherein the maximally populated angular region must be less than a maximum angular value before the agent moves away from the portion of the environment having a greatest object-saturation.

55. A computer program product as set forth in claim 54, wherein the environment is discretized into bins, and wherein the portion of the environment having the greatest-object saturation is determined by finding a maximally populated bin with a maximum set of objects.

56. A computer program product as set forth in claim 55, wherein the bins may be combined into super bins, whereby a resolution used for determining the portion of the environment having the greatest-object saturation may be varied.

57. A computer program product as set forth in claim 54, where the adjustment measure is performed by determining a maximally opposite angular direction from the object within the immediate zone and moving the agent a distance in the maximally opposite direction.

58. A computer program product as set forth in claim 57, where objects are classified into multiple classes, and wherein a first zone, a second zone, and an immediate zone are independently assigned to each class.

59. A computer program product as set forth in claim 58, wherein the first zone, the second zone, and the immediate zone are independently adjustable based on at least one characteristic selected from a group consisting of object class, environmental characteristics, and task characteristics.

60. A computer program product as set forth in claim 59, wherein the classes of objects include other agents and obstacles.

61. A computer program product as set forth in claim 60, wherein the adjustment measure varies according to the class of object in the immediate zone.

62. A computer program product as set forth in claim 61, wherein the agents are mobile computing devices, and wherein the mobile computing devices move within an environment in at least two dimensions.

63. A computer program product as set forth in claim 62, wherein at least one of a minimally populated angular region and a maximally populated angular region are adjusted based on at least one factor selected from a group consisting of object class, environmental characteristics, and task characteristics.

64. A computer program product as set forth in claim 42, wherein the portion of the environment having the least-object saturation is determined by searching for a minimally populated region outside the first zone having a minimum set of objects.

65. A computer program product as set forth in claim 64, wherein the environment is a physical space, and wherein the minimally populated region is a minimally populated angular region.

66. A computer program product as set forth in claim 65, wherein the minimally populated angular region must exceed a minimum angular value before the agent moves toward the portion of the environment having a least object-saturation.

67. A computer program product as set forth in claim 66, wherein the minimally populated angular region is a maximum unoccupied angular region.

68. A computer program product as set forth in claim 67, wherein at least one of a minimally populated angular region and a maximally populated angular region are adjusted based on at least one factor selected from a group consisting of object class, environmental characteristics, and task characteristics.

69. A computer program product as set forth in claim 64, wherein the environment is discretized into bins, and wherein the portion of the environment having the least-object saturation is determined by finding the minimally populated bin.

70. A computer program product as set forth in claim 69, wherein the bins may be combined into super bins, whereby a resolution used for determining the portion of the environment having the least-object saturation may be varied.

71. A computer program product as set forth in claim 42, wherein the portion of the environment having a greatest object-saturation is determined by searching for a populated region outside the first zone having a maximum set of objects.

72. A computer program product as set forth in claim 71, wherein the environment is a physical space, and wherein the populated region is a maximally populated angular region.

73. A computer program product as set forth in claim 72, wherein the maximally populated angular region must be less than a maximum angular value before the agent moves away from the portion of the environment having a greatest object-saturation.

74. A computer program product as set forth in claim 73, wherein at least one of a minimally populated angular region and a maximally populated angular region are adjusted based on at least one factor selected from a group consisting of object class, environmental characteristics, and task characteristics.

75. A computer program product as set forth in claim 71, wherein the environment is discretized into bins, and wherein the portion of the environment having the greatest-object saturation is determined by finding a maximally populated bin with a maximum set of objects.

76. A computer program product as set forth in claim 75, wherein the bins may be combined into super bins, whereby a resolution used for determining the portion of the environment having the greatest-object saturation may be varied.

77. A computer program product as set forth in claim 42, comprising a further means for, when the closest object is within an immediate zone, where the immediate zone is within the first zone, of performing an adjustment measure with respect to the closest object, where the adjustment measure is performed by determining a maximally opposite angular direction from the object within the immediate zone and moving the agent a distance in the maximally opposite direction.

78. A computer program product as set forth in claim 42, where objects are classified into multiple classes, and wherein the first zone is independently assigned to each class.

79. A computer program product as set forth in claim 78, wherein the first zone is adjustable based on at least one characteristic selected from a group consisting of object class, environmental characteristics, and task characteristics.

80. A computer program product as set forth in claim 79, wherein the classes of objects include other agents and obstacles.

81. A computer program product as set forth in claim 42, comprising a further means for, when the closest object is within an immediate zone, where the immediate zone is within the second zone, of performing an adjustment measure with respect to the closest object, wherein the adjustment measure varies according to the class of object in the immediate zone.

82. A computer program product as set forth in claim 42, wherein the agents are mobile computing devices, and wherein the mobile computing devices move within an environment in at least two dimensions.

83. A data processing system for directing movement of an agent in an environment, the data processing system comprising a processor, and a memory coupled with the processor, the data processing system further comprising means, operating therein, for:
   determining a first zone within the environment surrounding an agent and directions to any objects in at least a portion of the environment around the agent;
   determining whether the agent is surrounded by objects, and if the agent is surrounded by objects, keeping the agent stationary;
   if the agent is not surrounded by objects, determining whether a closest object is beyond a first zone from the agent; and
     if the closest object is beyond the first zone, moving the agent toward a portion of the environment having a greatest object-saturation; and
     if the closest object is within the first zone, moving the agent toward a portion of the environment having a least object-saturation.

84. A data processing system as set forth in claim 83, comprising a further means for, when the closest object is within a second zone, where the second zone is within the first zone, moving the agent toward a portion of the environment having the least object-saturation, and when the closest object is beyond the second zone, but within the first zone, keeping the agent substantially stationary.

85. A data processing system as set forth in claim 83, comprising a further means for, when the closest object is within an immediate zone, where the immediate zone is within the first zone, of performing an adjustment measure with respect to the closest object.

86. A data processing system as set forth in claim 84, comprising a further means for, when the closest object is within an immediate zone, where the immediate zone is within the second zone, of performing an adjustment measure with respect to the closest object.

87. A data processing system as set forth in claim 86, wherein the portion of the environment having the least-object saturation is determined by searching for a minimally populated region outside the second zone having a minimum set of objects.

88. A data processing system as set forth in claim 87, wherein the environment is a physical space, and wherein the minimally populated region is a minimally populated angular region.

89. A data processing system as set forth in claim 88, wherein the minimally populated angular region must exceed a minimum angular value before the agent moves toward the portion of the environment having a least object-saturation.

90. A data processing system as set forth in claim 89, wherein the minimally populated angular region is a maximum unoccupied angular region.

91. A data processing system as set forth in claim 87, wherein the environment is discretized into bins, and wherein the portion of the environment having the least-object saturation is determined by finding the minimally populated bin.

92. A data processing system as set forth in claim 91, wherein the bins may be combined into super bins, whereby a resolution used for determining the portion of the environment having the least-object saturation may be varied.

93. A data processing system as set forth in claim 90, wherein the portion of the environment having a greatest object-saturation is determined by searching for a populated region outside the first zone having a maximum set of objects.

94. A data processing system as set forth in claim 93, wherein the environment is a physical space, and wherein the populated region is a maximally populated angular region.

95. A data processing system as set forth in claim 94, wherein the maximally populated angular region must be less than a maximum angular value before the agent moves away from the portion of the environment having a greatest object-saturation.

96. A data processing system as set forth in claim 95, wherein the environment is discretized into bins, and wherein the portion of the environment having the greatest-object saturation is determined by finding a maximally populated bin with a maximum set of objects.

97. A data processing system as set forth in claim 96, wherein the bins may be combined into super bins, whereby a resolution used for determining the portion of the environment having the greatest-object saturation may be varied.

98. A data processing system as set forth in claim 95, where the adjustment measure is performed by determining a maximally opposite angular direction from the object within the immediate zone and moving the agent a distance in the maximally opposite angular direction.

99. A data processing system as set forth in claim 98, where objects are classified into multiple classes, and wherein a first zone, a second zone, and an immediate zone are independently assigned to each class.

100. A data processing system as set forth in claim 99, wherein the first zone, the second zone, and the immediate zone are independently adjustable based on at least one characteristic selected from a group consisting of object class, environmental characteristics, and task characteristics.

101. A data processing system as set forth in claim 100, wherein the classes of objects include other agents and obstacles.

102. A data processing system as set forth in claim 101, wherein the adjustment measure varies according to the class of object in the immediate zone.

103. A data processing system as set forth in claim 102, wherein the agents are mobile computing devices, and wherein the mobile computing devices move within an environment in at least two dimensions.

104. A data processing system as set forth in claim 103, wherein at least one of a minimally populated angular region and a maximally populated angular region are adjusted based on at least one factor selected from a group consisting of object class, environmental characteristics, and task characteristics.

105. A data processing system as set forth in claim 83, wherein the portion of the environment having the least-object saturation is determined by searching for a minimally populated region outside the first zone having a minimum set of objects.

106. A data processing system as set forth in claim 105, wherein the environment is a physical space, and wherein the minimally populated region is a minimally populated angular region.

107. A data processing system as set forth in claim 106, wherein the minimally populated angular region must exceed a minimum angular value before the agent moves toward the portion of the environment having a least object-saturation.

108. A data processing system as set forth in claim 107, wherein the minimally populated angular region is a maximum unoccupied angular region.

109. A data processing system as set forth in claim 108, wherein at least one of a minimally populated angular region and a maximally populated angular region are adjusted based on at least one factor selected from a group consisting of object class, environmental characteristics, and task characteristics.

110. A data processing system as set forth in claim 105, wherein the environment is discretized into bins, and wherein the portion of the environment having the least-object saturation is determined by finding the minimally populated bin.

111. A data processing system as set forth in claim 110, wherein the bins may be combined into super bins, whereby a resolution used for determining the portion of the environment having the least-object saturation may be varied.

112. A data processing system as set forth in claim 83, wherein the portion of the environment having a greatest object-saturation is determined by searching for a populated region outside the first zone having a maximum set of objects.

113. A data processing system as set forth in claim 112, wherein the environment is a physical space, and wherein the populated region is a maximally populated angular region.

114. A data processing system as set forth in claim 113, wherein the maximally populated angular region must be less than a maximum angular value before the agent moves away from the portion of the environment having a greatest object-saturation.

115. A data processing system as set forth in claim 114, wherein at least one of a minimally populated angular region and a maximally populated angular region are adjusted based on at least one factor selected from a group consisting of object class, environmental characteristics, and task characteristics.

116. A data processing system as set forth in claim 112, wherein the environment is discretized into bins, and wherein the portion of the environment having the greatest-object saturation is determined by finding a maximally populated bin with a maximum set of objects.

117. A data processing system as set forth in claim 116, wherein the bins may be combined into super bins, whereby a resolution used for determining the portion of the environment having the greatest-object saturation may be varied.

118. A data processing system as set forth in claim 83, comprising a further means for, when the closest object is within an immediate zone, where the immediate zone is within the first zone, of performing an adjustment measure with respect to the closest object, where the adjustment measure is performed by determining a maximally opposite angular direction from the object within the immediate zone and moving the agent a distance in the maximally opposite direction.

119. A data processing system as set forth in claim 83, where objects are classified into multiple classes, and wherein the first zone is independently assigned to each class.

120. A data processing system as set forth in claim 119, wherein the first zone is adjustable based on at least one characteristic selected from a group consisting of object class, environmental characteristics, and task characteristics.

121. A data processing system as set forth in claim 120, wherein the classes of objects include other agents and obstacles.

122. A data processing system as set forth in claim 83, comprising a further means for, when the closest object is within an immediate zone, where the immediate zone is within the first zone, of performing an adjustment measure with respect to the closest object, wherein the adjustment measure varies according to the class of object in the immediate zone.

123. A data processing system as set forth in claim 83, wherein the agents are mobile computing devices, and wherein the mobile computing devices move within an environment in at least two dimensions.

124. A data processing system as set forth in claim 83, further comprising at least one sensor coupled with the processor for receiving information selected from a group comprising information regarding objects and information regarding the environment, and at least one means for mobility coupled with and controlled by the processor.

125. A data processing system as set forth in claim 124, further comprising a communication module connected with the processor for communicating with other agents.

126. A data processing system as set forth in claim 125, further comprising an output connected with the processor for providing output data from the data processing system.

127. A data processing system as set forth in claim 126, further comprising an input for receiving information, whereby the data processing system can receive commands from a user, a computer system, or from other agents.

128. A data processing system as set forth in claim 83, wherein operations of the data processing system are centralized.

129. A data processing system as set forth in claim 83, wherein the operations of the data processing system are distributed.

* * * * *